US009529189B1

(12) United States Patent
Langendijk et al.

(10) Patent No.: US 9,529,189 B1
(45) Date of Patent: Dec. 27, 2016

(54) REFLECTANCE IN ELECTROWETTING DISPLAYS

(71) Applicant: Amazon Technologies, Inc., Seattle, WA (US)

(72) Inventors: Erno Hermanus Antonius Langendijk, Eindhoven (NL); Christian Etienne Hendriks, Eindhoven (NL); Tulasi Sridhar Reddy Guntaka, Eindhoven (NL); Steven Ramos Carneiro, Eindhoven (NL); Pavel Novoselov, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/870,449

(22) Filed: Sep. 30, 2015

(51) Int. Cl.
*G02B 26/00* (2006.01)

(52) U.S. Cl.
CPC .................. *G02B 26/005* (2013.01)

(58) Field of Classification Search
CPC ............... G02B 26/005; G02B 26/004; G02B 2207/115; G09G 3/348
USPC .............................. 359/226.3, 228, 290, 665
See application file for complete search history.

(56) References Cited

U.S. PATENT DOCUMENTS 9,180,454 B2 * 11/2015 Heikenfeld .......... G02B 26/004

* cited by examiner

*Primary Examiner* — Tuyen Tra
(74) *Attorney, Agent, or Firm* — Lee & Hayes, PLLC (57) ABSTRACT

Subject matter disclosed herein relates to improving luminance and reducing color shifts in electrowetting displays. The electrowetting display comprises a plurality of electrowetting elements separated by partition walls and spacers. The spacers and/or partition walls are reflective. When incident light that enters a pixel or subpixel is reflected and encounters a spacer and/or partition wall, the light is reflected such that the reflected light exits the pixel or subpixel into which the incident light entered. This improves luminance and reduces color shifts of the electrowetting display.

20 Claims, 5 Drawing Sheets

REFLECTANCE IN ELECTROWETTING DISPLAYS

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display can affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

A type of electronic display known as an electrowetting display includes an array of pixels individually bordered by pixel walls that retain a fluid such as opaque oil, for example. Light transmission through each pixel is adjustable by electronically controlling a position of the fluid in the pixel. Luminance and resolution of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

In various embodiments described herein, electronic devices include electrowetting displays for presenting content and other information. The electrowetting displays generally comprise a plurality of electrowetting elements separated by partition walls and in some embodiments, spacers aligned with the partition walls. In embodiments the partition walls and/or spacers comprise a reflective material. Such partition walls and/or spacers can provide specular reflection or diffuse reflection.

In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for operating electronic devices including these components for the electrowetting displays and other features described herein. More particularly, various embodiments provide techniques that provide for improved reflectance in electrowetting displays.

A display device, such as an electrowetting display device, can be a transmissive, reflective, or transflective display that generally includes an array of display elements (e.g., pixels or subpixels) configured to be operated by an active matrix addressing scheme. For example, rows and columns of electrowetting elements are operated by controlling voltage levels on a plurality of source lines and gate lines. In this fashion, the display device can produce an image by selecting particular display elements to at least partly transmit, reflect or block light. Display elements are addressed (e.g., selected) via rows and columns of the source lines and gate lines that are electrically connected to transistors (e.g., used as switches) included in each display element. Transistors take up a relatively small fraction of the area of each display element to allow light to efficiently pass through (or reflect from) the display element. Herein, a display element may, unless otherwise specified, comprise a pixel or subpixel of an electrowetting display device. Such a pixel or subpixel may be the smallest element of a display that is individually operable to directly control an amount of light transmission or reflection through the element. For example, in some implementations, a display element may be a pixel that includes a red subpixel, a green subpixel, a blue subpixel and a white subpixel, i.e. a red-green-blue-white (RGBW) display. In other implementations, a display element may be a pixel that is a smallest component, e.g., the pixel does not include any subpixels.

Electrowetting displays include an array of display elements comprising pixels and/or subpixels located between two support plates, such as a first substrate and a second substrate. For example, the first substrate may be a bottom support plate that, in cooperation with the second substrate (which may be a top support plate), contains display elements that include at least one electrode, a first fluid being an electrowetting oil, a second fluid that includes an electrolyte (i.e. an electrolyte solution) and pixel walls between the support plates. Support plates may include glass, plastic (e.g., a transparent thermoplastic such as PMMA or other acrylic), or other material (transparent or non-transparent) and may be made of a rigid or flexible material, for example. In addition to display elements, spacers and edge seals can also be located between the support plates. Hereinafter, example embodiments are described as including substrates or support plates that comprise glass support plates. However, support plates can comprise any of a number of amorphous materials, such as plastic, glass, quartz, semiconductors, and so on, and claimed subject matter is not limited in this respect. At least one of the support plates is comprised of transparent material. Herein, describing an element or material as being "transparent" means that the element or material can transmit a relatively large fraction of the light incident upon it. For example, a transparent substrate or support plate or layer may transmit more than 70% or 80% of the light impinging on its surface, though claimed subject matter is not limited in this respect.

Individual electrowetting elements are surrounded by partition walls (also referred to as pixel walls) made, for instance, from photoresist material. In embodiments, the partition walls are disposed on the bottom support plate. Partition walls retain at least a first fluid which is electrically non-conductive, such as opaque or colored oil, in the individual pixels. A cavity formed between the support plates is filled with the first fluid (e.g., an electrowetting oil retained by partition walls) and a second fluid (e.g., an electrolyte solution) which is electrically conductive or polar and may be water or a salt solution such as a solution of potassium chloride in water. The second fluid may be transparent, but may be colored or light absorbing. The second fluid is substantially immiscible with the first fluid so that the first fluid and the second fluid do not substantially mix with each other, and in some examples do not mix with each other to any degree. Herein, substances are immiscible with one another if the substances do not substantially form a solution.

Spacers and edge seals which mechanically connect the bottom support plate with the overlying top support plate, or which form a separation between the bottom support plate and the top support plate, contribute to mechanical strength of the electrowetting display. Edge seals, for example, being disposed along a periphery of an array of electrowetting display elements, may contribute to retaining (e.g., first and second) fluids between the bottom support plate and the overlying top support plate.

In various embodiments, a display element of an electrowetting display includes, among other things, an electrode layer and a thin film transistor (TFT) that is switched to either select or deselect the electrowetting element using active matrix addressing. A TFT is a particular type of field-effect transistor that includes thin films of an active semiconductor layer as well as a dielectric layer and metallic contacts over a supporting substrate, which may be glass or any of a number of other materials, for example. Generally, there are various layers between the TFTs and the first fluid.

In some embodiments, an electrowetting display as described herein can comprise a portion of a system that includes one or more processors and one or more computer memories, which may reside on a control board, for example. Display software can be stored on the one or more memories and can be operable with the one or more processors to modulate light that is received from an outside source (e.g., ambient room light) or out-coupled from a light guide of the electrowetting display. For example, display software can include code executable by a processor to modulate optical properties of individual pixels of the electrowetting display based, at least in part, on electronic signals representative of image or video data. The code can cause the processor to modulate the optical properties of pixels by controlling electrical signals (e.g., voltages, currents, fields, and so on) on, over, or in layers of the electrowetting display.

In embodiments, an array of color filter elements may be disposed on the top support plate to provide various colored pixels or subpixels within the electrowetting display. During operation of the electrowetting display, a pixel or subpixel may be activated and the first fluid moves towards a partition wall while the second fluid moves onto a hydrophobic layer to replace the first fluid. Light enters the pixel or subpixel through the color filter element and is reflected back through the pixel or subpixel, through the color filter element. Thus, depending on the color of the color filter element, various colors can be produced by the electrowetting display. For example, for an RGBW display, the display includes red, green, blue and white color filter elements. Thus, the light entering the pixels or subpixels and reflecting out of the pixels or subpixels will have one of a red color, a green color, a blue color, a white color.

In embodiments, a black matrix grid may be included. While the black matrix is disclosed herein as being black in order to block the passage of light therethrough, the matrix may be another color.

In various embodiments, the black matrix is disposed on the top support plate and substantially aligned with the spacers, which are aligned with the partition walls disposed on the bottom support plate. However, due to various possible factors such as, for example, a gap between the black matrix, the spacers and/or the partition walls, material used for the spacers, the partition walls and/or the black matrix, etc., light may enter a pixel or subpixel and be reflected out of an adjacent pixel or subpixel. Thus, incident light may enter through a color filter element in a first pixel or subpixel, but then the reflected light may pass between the black matrix and the spacer and/or the partition wall and exit through a second color filter element associated with an adjacent second pixel or subpixel. Reflected light may also pass through the spacer or the partition wall (e.g., the spacer and/or partition wall comprises a transparent material) and pass through the adjacent second pixel or subpixel. This is generally referred to as crosstalk. Thus, light entering through a white color filter element in a pixel or subpixel may be reflected out of the electrowetting display through a spacer or partition wall through a green color filter element in an adjacent pixel or subpixel, thereby coloring the desired white light to a green color and generally decreasing luminance and causing a color shift. However, depending upon the color filter element through which the light enters and the color filter element through which the light exits, the change in color may be a black or very dark color due to the relationship between the two colors of the color filter elements within the color spectrum. Thus, there may be a decrease in luminance and/or a color shift display due to the mixing of the two colors.

In accordance with embodiments, the spacers, if included in the electrowetting display, comprise photoresist material. In embodiments, the spacers are reflective. For such embodiments, the photoresist material may be doped with metal, such as, for example, aluminum, in order to make the spacers reflective. Thus, the spacers provide specular reflection and the spacers reflect light in a manner similar to a mirror. In other embodiments, the photoresist material of the spacers may be doped with a pigment or dye to make the partition walls white in order to reflect light. In such an embodiment, the spacers provide diffuse reflection. In accordance with other embodiments, the photoresist material of the spacers may be "roughened" by adding granular materials to the photoresist material in order to provide diffuse reflection. Alternatively, the photoresist material of the spacers may be selected or altered such that the refractive index of the photoresist material is greater than or less than the refractive index of the second fluid of the electrowetting display by 0.15 or more. Thus, with such reflective spacers, incident light that enters a pixel or subpixel and reflects off layers on the bottom support plate and encounters the spacers will not pass through the spacers and exit an adjacent pixel or subpixel, but will rather reflect off the spacers and exit the pixel or subpixel into which the incident light entered. Thus, the reflected light will not change colors or be darkened and, thus, luminance may be improved and color shifts may be reduced.

Figure 1A:
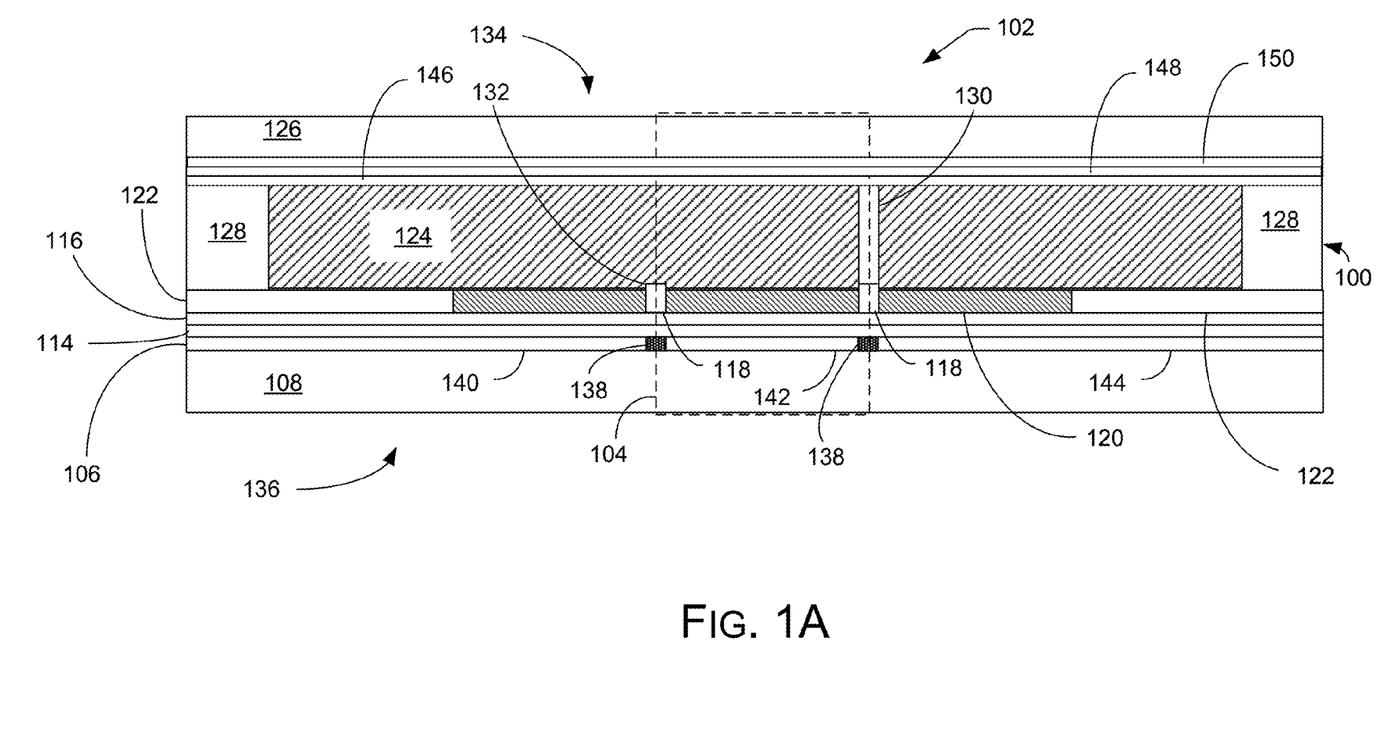
FIG. 1A is a cross-section of an electrowetting display panel of an electrowetting display, according to some embodiments.

In accordance with embodiments, the partition walls comprise photoresist material. In embodiments, the partition walls are reflective. For such embodiments, the photoresist material of the partition walls may be doped with a pigment or dye to make the partition walls white in order to reflect light. In such an embodiment, the partition walls provide diffuse reflection. In other embodiments, the photoresist material may be doped with metal, such as, for example, aluminum, in order to make the partition walls reflective. Thus, the partition walls provide specular reflection and the partition walls reflect light in a manner similar to a mirror. In accordance with other embodiments, the photoresist material of the partition walls may be "roughened" by adding granular materials to the photoresist material in order to provide diffuse reflection. Alternatively, the photoresist material of the partition walls may be selected or altered such that the refractive index of the photoresist material is greater than or less than the refractive index of the second fluid of the electrowetting display by 0.15 or more. Thus, with such reflective partition walls, incident light that enters a pixel or subpixel and reflects off layers on the bottom support plate and encounters the partition walls will not pass through the partition walls and exit an adjacent pixel or subpixel, but will rather reflect off the partition walls and exit the pixel or subpixel into which the incident light entered. Thus, the reflected light will not change colors or be darkened and, thus, luminance may be improved and color shifts may be reduced FIG. 1A is a cross-section of a portion of an electrowetting display panel 100 for an electrowetting display 102. FIG. 1A illustrates several electrowetting elements 104, according to some embodiments. Though three such electrowetting elements 104 are illustrated, an electrowetting display panel may include any number (usually a very large number, such as thousands or millions) of electrowetting elements 104. An electrode layer 106 is disposed on a first support plate 108 and may comprise one or more individual electrodes (e.g., first electrodes 110 illustrated in FIG. 1B) in each electrowetting element 104.

In various embodiments, the electrode layer 106 may be connected to any number of thin film transistors (TFTs) (e.g., TFTs 112 illustrated in FIG. 1B)) that are switched to either select or deselect electrowetting elements 104 using active matrix addressing, for example. In some implementations, an optional dielectric barrier layer 114 may at least partially separate the electrode layer 106 from a hydrophobic layer or surface 116 also disposed on the first support plate 108. In some implementations, the hydrophobic layer 116 may comprise any of a number of types of fluoropolymers, such as AF1600®, produced by DuPont, based in Wilmington, Del. The hydrophobic layer 116 may also be any of a number of water-repelling materials that affect wettability of an adjacent material, for example.

Figure 1B:
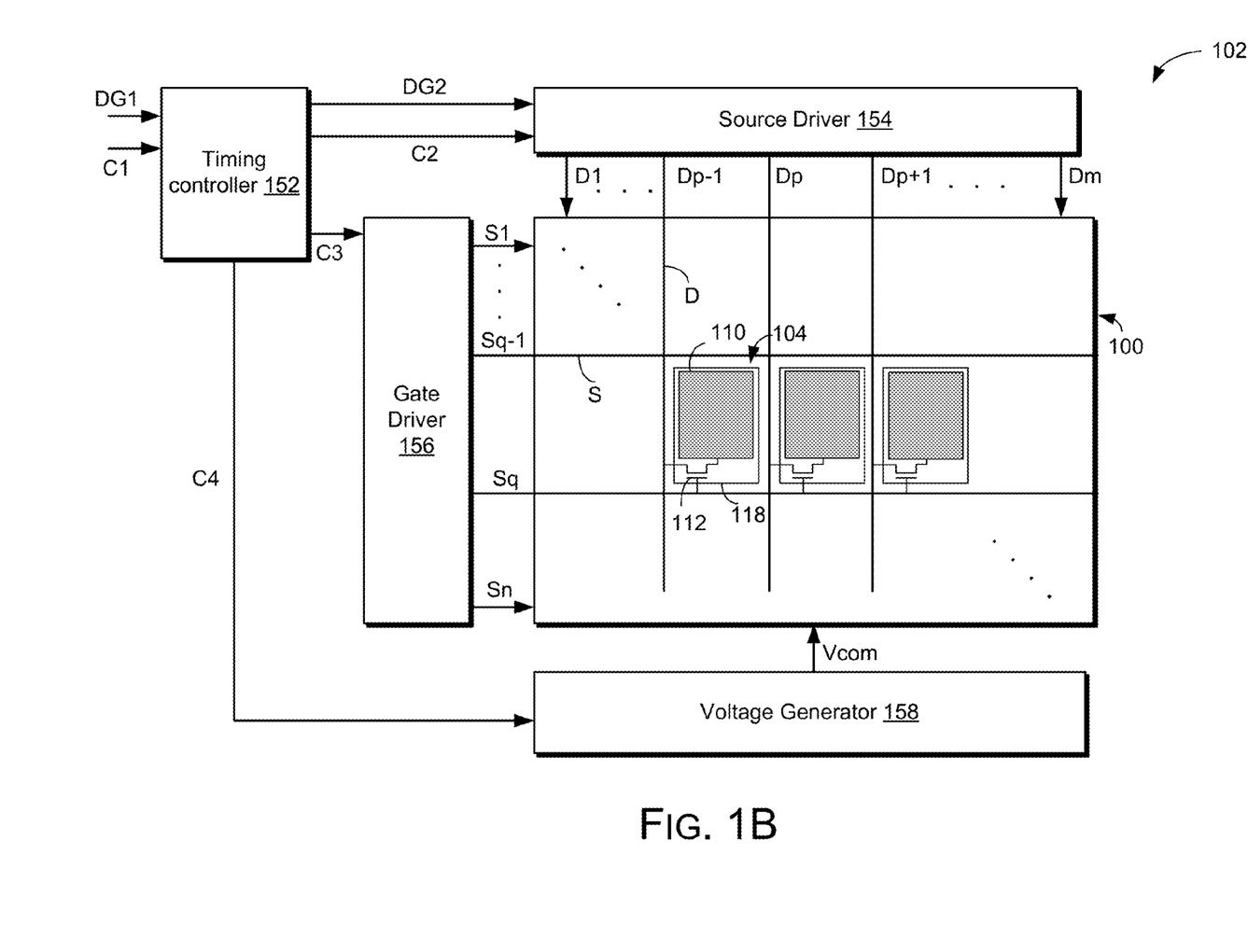
FIG. 1B is a schematic view of an example of an electrowetting display that includes the electrowetting display panel of FIG. 1A, according to various embodiments.

Partition walls 118 form a patterned electrowetting element grid on the hydrophobic layer 116. The partition walls 118 may comprise a photoresist material such as, for example, epoxy-based negative photoresist SU-8 and may be formed using a photolithographic process. In embodiments, the partition walls 118 further comprise a reflective material, as will be discussed more fully herein. The partition walls 118 provide a patterned electrowetting element grid that comprises rows and columns, as illustrated in FIG. 1B, that form an array of electrowetting elements 104. For example, an electrowetting element 104 may have a width and length in a range of about 50 to 500 microns. In some implementations, the partition walls 118 need not be on the hydrophobic layer 116. For example, the partition walls 118 may be directly on the electrode layer 106 (not illustrated in FIG. 1A).

A first fluid 120, which may have a thickness (e.g., depth, height) in a range of about 1 to 10 microns, for example, overlies the hydrophobic layer 116. The first fluid 120 is partitioned by the partition walls 118 of the patterned electrowetting element grid. An outer rim 122 may comprise the same material as the partition walls 118. A second fluid 124, such as an electrolyte solution, overlies the first fluid 120 and is at least partially immiscible with the second fluid 124 so that the first fluid and the second fluid do not substantially mix with each other, and in some examples do not mix with each other to any degree. Herein, substances are immiscible with one another if the substances do not substantially form a solution. The second fluid 124 is preferably transparent, but may be colored or absorbing. The first fluid 120 is non-polar and/or non-conductive and may for instance be an alkane such as, for example, hexadecane or (silicone) oil.

A second support plate 126 covers the second fluid 124 and edge seals 128 maintain the second fluid 124 over the electrowetting element array. The second support plate 126 may be supported by the edge seals 128 and an array or grid of spacers 130. The array of spacers 130 may be coupled to the second support plate 126 and may substantially extend over the array of electrowetting elements 104. For example, portions of the spacers 130 may extend from the tops 132 of the partition walls 118 to the second support plate 126. In embodiments, the spacers 130 are not in contact with the partition walls 118. In such embodiments, the spacers 130 may still be substantially aligned with the partition walls 118. Other embodiments may not include the spacers 130. The spacers 130 may comprise a photoresist material such as, for example, epoxy-based negative photoresist SU-8 and may be formed using a photolithographic process. In embodiments, the spacers 130 further comprise a reflective material, as will be discussed more fully herein.

The electrowetting display panel 100 has a viewing side 134 on which an image formed by the electrowetting display panel 100 may be viewed, and a rear side 136. The second support plate 126 faces the viewing side 134 and the first support plate 108 faces the rear side 136. The electrowetting display panel 100 may be an active matrix driven display type or a passive matrix driven display, just to name a few examples.

Separation block 138 represents a discontinuity of electrical conductivity along the electrode layer 106. For example, a first portion 140 of the electrode layer 106 may be electrically insulated or separated from a second portion 142 and a third portion 144 of the electrode layer 106 so that each portion 140, 142, and 144 is connected to a respective electrowetting element 104. The electrode layer 106 does not necessarily need to extend to edges of the display area of the electrowetting display panel, as illustrated in FIG. 1A, i.e. the electrode layer 106 does not necessarily need to extend under the outer rim 122 and/or the edge seals 128.

In some embodiments, the electrowetting elements 104 include a second electrode 146 (also known as a common electrode) disposed on the second support plate 126, one or more color filters (not illustrated in FIG. 1A), or a black matrix (not illustrated in FIG. 1A). The second electrode 146 on the second support plate 126 may or may not be patterned to form any of a number of circuit configurations, for example.

The hydrophobic layer 116 is arranged on the first support plate 108 to create an electrowetting surface area. The hydrophobic character of the hydrophobic layer 116 causes the first fluid 120 to adhere preferentially to the first support plate 108 since the first fluid 120 has a higher wettability with respect to the surface of the hydrophobic layer 116 than the second fluid 124. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

The first fluid 120 absorbs at least a part of the optical spectrum. The first fluid 120 may be transmissive for a part of the optical spectrum, forming a color filter. For this purpose, the fluid may be colored by addition of pigment particles or dye, for example. Alternatively, the first fluid 120 may be colored or black (e.g., absorbing substantially all parts of the optical spectrum) or reflecting (e.g., reflecting substantially all parts of the optical spectrum). The hydrophobic layer 116 may be transparent or colored. A reflecting layer (not illustrated) may be included and may reflect the entire, or substantially the entire, visible spectrum, making the layer appear white, or part of the visible spectrum, causing the layer to have a color. In embodiments, other layers, or combinations of layers, described herein may have reflective properties as just described and thus, such embodiments may not include a separate reflecting layer.

If a voltage is applied across the electrowetting element 104 (e.g., between the electrode layer 106 and the second electrode 146), the electrowetting element 104 will enter into an active state. Electrostatic forces will move the second fluid 124 toward the electrode layer 106, thereby displacing at least a portion of the first fluid 120 from the area of the hydrophobic layer 116 to the partition walls 118 surrounding the area of the hydrophobic layer 116, to a droplet-like shape. The electrowetting element 104 may be referred to as open or activated. Such displacing action at least partly uncovers the first fluid 120 from the surface of the hydrophobic layer 116 of the electrowetting element 104.

If the voltage across the electrowetting element 104 is returned to an inactive signal level of zero or a value near to zero, the electrowetting element 104 will return to an inactive state, where the first fluid 120 flows back to cover the hydrophobic layer 116. The electrowetting element 104 may be referred to as closed or deactivated. In this way, the first fluid 120 forms an electrically controllable optical switch in each electrowetting element 104. Of course, such details of an electrowetting display are merely examples, and claimed subject matter is not limited in this respect.

In embodiments, the electrowetting display panel 100 may include a color filter layer 148 that is configured as an array of color filter elements. Additionally, the electrowetting display panel 100 may include a black matrix grid layer 150 that is configured as a black matrix grid. The black matrix grid generally comprises a black material or other dark material to block, or substantially block, the passage of light therethrough. The black matrix grid generally aligns with edges between individual color filter elements. The black matrix grid layer 150 is generally processed on the second support plate 126 first. Then the various color filter elements in the color filter layer 148 are created by lithographic steps. The individual color filter elements may be in contact with each other on top of the black matrix grid but that is generally not visible from the viewing side 134 of the electrowetting display panel 100 as the black matrix grid layer 150 is the first layer on the second support plate 126. After deposition of the color filter elements, a conducting layer is deposited that serves as the second electrode 146 for the electrowetting display panel 100.

Referring to FIG. 1B, an example of an electrowetting display 102 is schematically illustrated that includes a timing controller 152, a source driver (data driver) 154, a gate driver (scan driver) 156, a voltage generator 158, and the electrowetting display panel 100. The electrowetting display panel 100 is driven by the timing controller 152, the source driver 154, the gate driver 156 and the voltage generator 158 based upon image data received from an external image source. In embodiments, the timing controller 152 may comprise a memory (not illustrated) to store the image data received from the image source.

As an example of general operation of the electrowetting display 102, responsive to a first data signal DG1 and a first control signal C1 from an external image source, e.g., a graphic controller (not illustrated), the timing controller 152 applies a second data signal DG2 and a second control signal C2 to the source driver 154; a third control signal C3 to the gate driver 156; and a fourth control signal C4 to the voltage generator 158. The source driver 154 converts the second data signal DG2 to voltages, i.e., data signals, and applies the data signals D1, . . . , Dp−1, Dp, Dp+1, . . . , Dm to the electrowetting display panel 100. The gate driver 156 sequentially applies scan signals S1, . . . , Sq−1, Sq, . . . , Sn to the electrowetting display panel 100 in response to the third control signal C3.

The timing controller 152 controls the voltage generator 158, applies a common voltage Vcom to a second electrode (also known as a common electrode and illustrated as 146 in FIG. 1A) of the electrowetting display panel 100 in response to the fourth control signal C4. Although not illustrated in FIG. 1B, the voltage generator 158 generates various voltages required by the timing controller 152, the source driver 154, and the gate driver 156. For example, the voltage generator 158 may generate voltages for the source driver 154 and the gate driver 156, in addition to the common voltage Vcom.

Electrowetting elements 104 are positioned adjacent to crossing points of the data lines D and the gate lines S and thus are arranged in a grid of rows and columns. Each electrowetting element 104 includes a thin film transistor (TFT) 112 in electrical contact with a first electrode (also known as a pixel electrode) 110 under the hydrophobic surface 116 (not illustrated in FIG. 1B). A TFT is a particular type of field-effect transistor that includes thin films of an active semiconductor layer as well as a dielectric layer and metallic contacts over or on a supporting (but non-conducting) substrate, which may be glass or any of a number of other transparent or non-transparent materials, for example. Each electrowetting element 104 may also include a storage capacitor (not illustrated) under the hydrophobic surface.

A plurality of intersecting partition walls (also referred to as pixel walls) 118 separates the electrowetting elements 104. The electrowetting elements 104 can represent pixels within the electrowetting display panel 100 and/or subpixels within the electrowetting display panel 100, depending upon the application for the electrowetting display 102.

The electrowetting display panel 100 includes m data lines D, i.e., source lines, to transmit the data voltages and n gate lines S, i.e., scan lines, to transmit a gate-on signal to the TFTs 112 to control the electrowetting elements 104. Thus, the timing controller 152 controls the source driver 154 and the gate driver 156.

As previously noted, the timing controller 152 applies a second data signal DG2 and a second control signal C2 to the source driver 154; a third control signal C3 to the gate driver 156; and a fourth control signal C4 to the voltage generator 158 to drive the electrowetting elements 104. The gate driver 156 sequentially applies scan signals S1, . . . , Sq−1, Sq, . . . , Sn to the electrowetting display panel 100 in response to the third control signal C3 to activate rows of electrowetting elements 104 via the gates of the TFTs 112. The source driver 154 converts the second data signal DG2 to voltages, i.e., data signals, and applies the data signals D1, . . . , Dp−1, Dp, Dp+1, . . . , Dm to sources (or drains) of the TFTs 112 of the electrowetting elements 104 within an activated row of the electrowetting elements 104 to thereby, in conjunction with a voltage provided by the second electrode, activate (or leave inactive) electrowetting elements 104 within the activated row of the electrowetting elements 104.

Figure 2A:
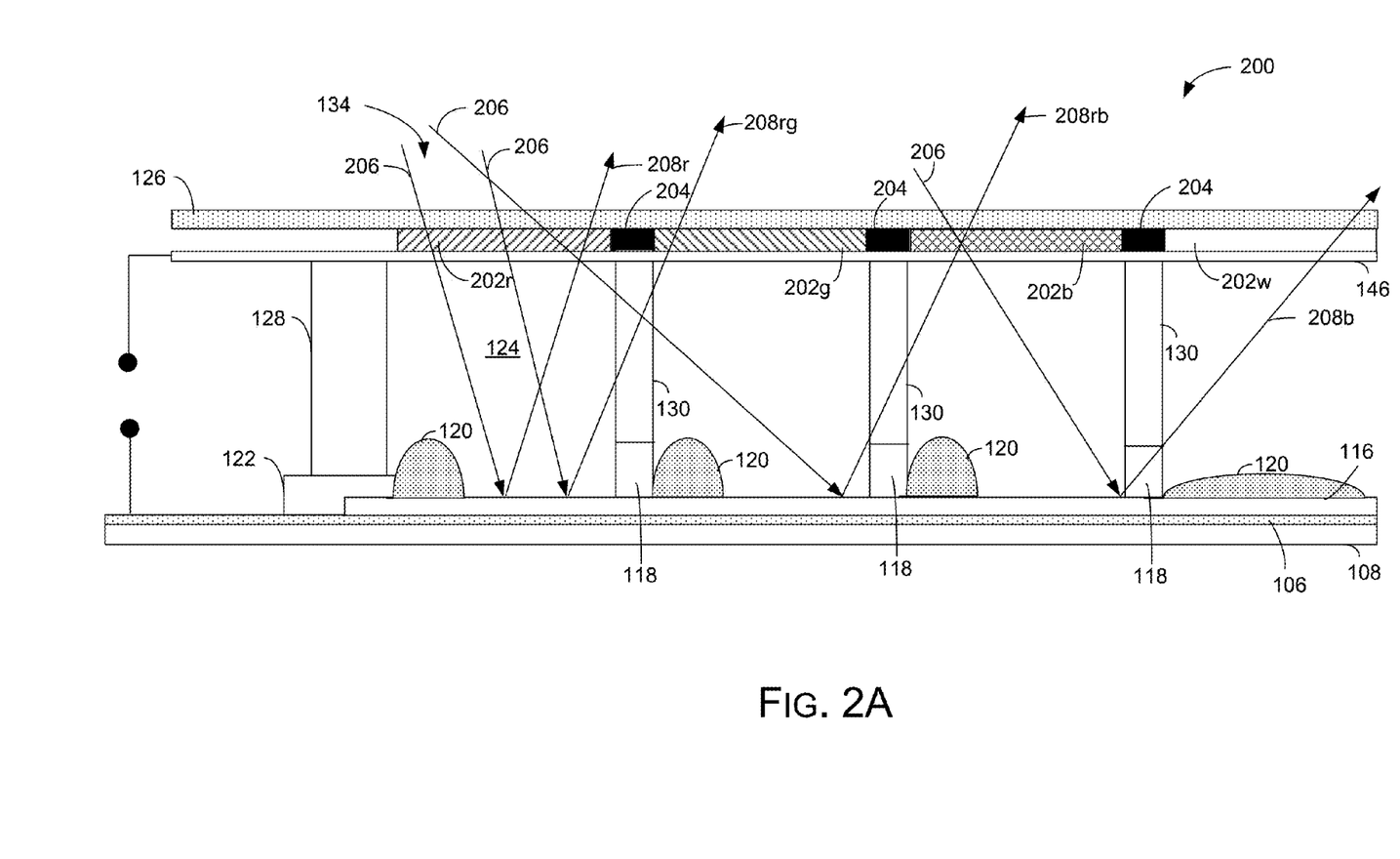
FIG. 2A schematically illustrates crosstalk among pixels or subpixels of the electrowetting display of FIGS. 1A and 1B.

FIG. 2A schematically illustrates a cross-section of a portion of an example of an electrowetting display panel 200 similar to the cross-section of the example electrowetting display panel 100 illustrated in FIG. 1A. Various elements of the electrowetting display panel may not be illustrated in FIG. 2A, or may be illustrated in a simplified fashion, for clarity and ease of description. The electrowetting display panel 200 includes an array of color filter elements 202 disposed on the second support plate 126, with edges of color filter elements 202 substantially aligning with the black matrix grid 204, which substantially aligns with the partition walls disposed on the first support plate 108. Thus, the color filter elements 202 are substantially aligned with the pixels or subpixels (i.e. electrowetting elements 104). While FIG. 2A illustrates the black matrix grid 204 on a same level as the array of color filter elements 202 (i.e. the black matrix grid 204 is between edges of adjacent color filter elements 204), this may not necessarily be the case. As previously noted, the black matrix grid 204 may be created in a layer and then the array of color filter elements 202 may be created in a layer on the black matrix grid 204. The color filter elements 202 may be individually disposed on the second support plate 126.

In the example of FIG. 2A, the color filter elements 202 are arranged for an RGBW display. Thus, the array includes red, green, white and white color filter elements 202r, 202g, 202w and 202b, respectively. The array may be arranged differently and configured for other types of displays such as, for example an RGB display.

As can be seen in FIG. 2A, when a pixel or subpixel (i.e. electrowetting element 104), is activated, i.e. "open," the first fluid 120 is displaced by the second fluid 124 on the hydrophobic layer 116 and thus, the first fluid 120 "moves" towards a corresponding partition wall 118. Incident light 206 entering an entrance of the pixel through the second support plate 126 passes through a corresponding color filter element 202 located adjacent to the viewing side 134 of the electrowetting display panel 200. The incident light 206 is reflected from one or more of the electrode layer 106, the optional barrier layer 114, the hydrophobic layer 116, or a separate reflecting layer (not illustrated) and preferably passes back through the corresponding color filter element 202, thus exiting the electrowetting display panel 200. (While the incident light can reflect off one or more layers as previously mentioned, for clarity, the incident light will be described herein as reflecting off the hydrophobic layer 116.)

For example, as can be seen in FIG. 2A, incident light 206 can enter through a red color filter element 202r and exit through the same red color filter element 202r, thus creating red light 208r. However, incident light 206 can also enter through the red color filter element 202r, reflect off the hydrophobic layer 116 through a spacer 130 (which is generally transparent) and exit through the green color filter element 202g of the adjacent pixel, producing light 208rg, which has been color shifted from red to red/green. Likewise, as can be seen in FIG. 2A, some of the incident light 206 can enter through the red color filter element 202r, pass through two spacers 130, thereby passing into another pixel two pixels away. The reflected red light 208r is then reflected off the hydrophobic layer 116 out of the pixel through a blue color filter element 202b, thereby providing color shifted red/blue light 208rb through the blue color filter element 202b that may not be desired. Furthermore, incident light 206 may enter an open pixel or subpixel (e.g., the first fluid 120 is displaced by the second fluid 124 on the hydrophobic layer 116), e.g., through a pixel or subpixel that includes the color filter element 202b, but exit through a closed pixel or subpixel e.g., through a pixel or subpixel that includes color filter element 202w, which is undesirable. Incident light 206 can also reflect from the hydrophobic layer 116 through a partition wall 118 (which are generally transparent) and exit through an adjacent pixel. Thus, some of the incident light 206 can enter through the blue color filter element 202b, pass through a partition wall 118, thereby passing into an adjacent pixel. The reflected blue light 208b exits through a white color filter element 202w, thereby providing blue light 208b through the white color filter element 202w that may not be desired. As previously noted, this is generally referred to as crosstalk among the pixels. Thus, the reflected light 208 may change color or may be darkened, thereby reducing luminance and/or providing color shifts.

In accordance with various embodiments, the spacers 130 are reflective (e.g., reflecting substantially all parts of the optical spectrum) and comprise a reflective material. As previously noted, the spacers 130 generally comprise photoresist material. Thus, in accordance with embodiments, the photoresist material may be doped with a reflective material in the form of a dye and/or pigment in order to provide diffuse reflection, i.e. incident light rays are reflected at many angles or scattered. An example of such a dye or pigment is titanium oxide (TiO). Other examples include, but are not limited to, aluminum nitride ($AlNO_3$), as well as silver nitrate (AgN). The photoresist material of the spacers 130 may also be mixed a priori with aluminum or silver particles, among other possible materials, prior to depositing the photoresist material for the spacers 130. The amount of particles mixed with the photoresist material generally depends on the magnitude of the effect desired. The spacers 130 may also be produced by techniques other than photolithography such as, for example, embossing, imprinting, electroforming, etc.

Alternatively, in order to provide diffuse reflection, the spacers 130 may be "roughened" with a reflective material in the form of granular materials within the photoresist material. The granular materials may be added such that the materials form agglomerates of a certain grain size or growth, while controlling a number of parameters including temperature and deposition rate. The roughness can also be achieved using an additional process step, such as, for example, chemical etching. The roughened photoresist material provides diffuse reflection. In accordance with embodiments, the granular material may comprise aluminum or silver agglomerate, or can be titanium oxide or titanium dioxide (TiO or TiO$_2$), for example. Other suitable materials may be provided as long as the size of the grains within the granular material has a size in a range of 0.1-1 micrometers. The size of the grains within the granular material generally also depends on the size of the spacers 130.

In other embodiments, a reflective material in the form of metal particles may be added to the photoresist material of the spacers 130 in order to provide specular reflection by the spacers 130, i.e. incident light rays are reflected at just one angle. One example of metal includes aluminum (Al). Examples of other metal materials include, but are not limited to, silver. Alternatively, the photoresist material may comprise a reflective material that gives the photoresist material a refractive index greater than or less than the refractive index of the second fluid 124. For example, glass with additives, (or actually doped) which will change the refractive index of the photoresist material. Silica (SiO$_2$) is one example material. The spacers 130 may also be hollow, which generally also leads to the same effect. In general, if the refractive index of the photoresist material is greater than or less than the refractive index of the second fluid 124 by approximately 0.15 or more, based upon Snell's Law, light reflected off the hydrophobic layer 116 through the second fluid 124 of a pixel or subpixel that is then incident to the spacer 130 will generally reflect out of the pixel or subpixel into which the original incident light entered. In general the refractive index of the photoresist material will be less that the refractive index of the second fluid 124. The amount of difference is also dependent on the angle of incidence and will vary from material to material. Likewise, incident light that reflects off a spacer 130 and then reflects off the hydrophobic layer 116 will generally reflect out of the pixel or subpixel into which the original incident light entered. For example, in embodiments, the second fluid 124 has a refractive index of approximately 1.45. In such embodiments, the spacers 130 may have a refractive index of approximately 1.30 or less, or approximately 1.60 or more.

In some embodiments, the partition walls 118 are reflective (e.g., reflecting substantially all parts of the optical spectrum) in addition to, or instead of, the spacers 130. In some embodiments, only the spacers 130 are reflective. As previously noted, the partition walls 118 generally comprise photoresist material. Thus, in accordance with embodiments, the photoresist material may be doped with a reflective material in the form of a dye and/or pigment in order to provide diffuse reflection, i.e. incident light rays are reflected at many angles or scattered. An example of such a material is titanium oxide (TiO). Other examples include, but are not limited to, aluminum nitride (AlNO$_3$), as well as silver nitrate (AgN). The photoresist material of the partition walls 118 may also be mixed a priori with aluminum or silver particles, among other possible materials, prior to depositing the photoresist material for the partition walls 118. The amount of particles mixed with the photoresist material generally depends on the magnitude of the effect desired. The partition walls 118 may also be produced by techniques other than photolithography such as, for example, embossing, imprinting, electroforming, etc.

Alternatively, in order to provide diffuse reflection, the partition walls 118 may be "roughened" with a reflective material in the form of granular materials within the photoresist material. The granular materials may be added such that the materials form agglomerates of a certain grain size or growth, while controlling a number of parameters including temperature and deposition rate. The roughness can also be achieved using an additional process step, such as, for example, chemical etching. The roughened photoresist material provides diffuse reflection. In accordance with embodiments, the granular material may comprise aluminum or silver agglomerate, or can be titanium oxide or titanium dioxide (TiO or TiO$_2$), for example. Other suitable materials may be provided as long as the size of the grains within the granular material has a size in a range of 0.1-1 micrometers. The size of the grains within the granular material generally also depends on the size of the partition walls 118.

In other embodiments, a reflective material in the form of metal particles may be added to the photoresist material of the partition walls 118 in order to provide specular reflection by the partition walls 118, i.e. incident light rays are reflected at just one angle. One example of metal includes aluminum (Al). Examples of other metal materials include, but are not limited to, silver. Alternatively, a reflective material that gives the photoresist material a refractive index greater than or less than the refractive index of the second fluid 124. For example, glass with additives, (or actually doped) which will change the refractive index of the photoresist material. Silica (SiO$_2$) is one example material. The partition walls 118 may also be hollow, which generally also leads to the same effect. In general, if the refractive index of the photoresist material is greater than or less than the refractive index of the second fluid 124 by approximately 0.15 or more, based upon Snell's Law, light reflected off the hydrophobic layer 116 through the second fluid 124 of a pixel or subpixel that is then incident to the partition walls 118 will generally reflect out of the pixel or subpixel into which the original incident light entered. As previously noted, in general the refractive index of the photoresist material will be less that the refractive index of the second fluid 124. The amount of difference is also dependent on the angle of incidence and will vary from material to material. Likewise, incident light that reflects off a partition wall 118 and then reflects off the hydrophobic layer 116 will generally reflect out of the pixel or subpixel into which the original incident light entered. For example, in embodiments, the second fluid 124 has a refractive index of approximately 1.45. In such embodiments, the partition walls 118 may have a refractive index of approximately 1.30 or less, or approximately 1.60 or more.

Figure 2B:
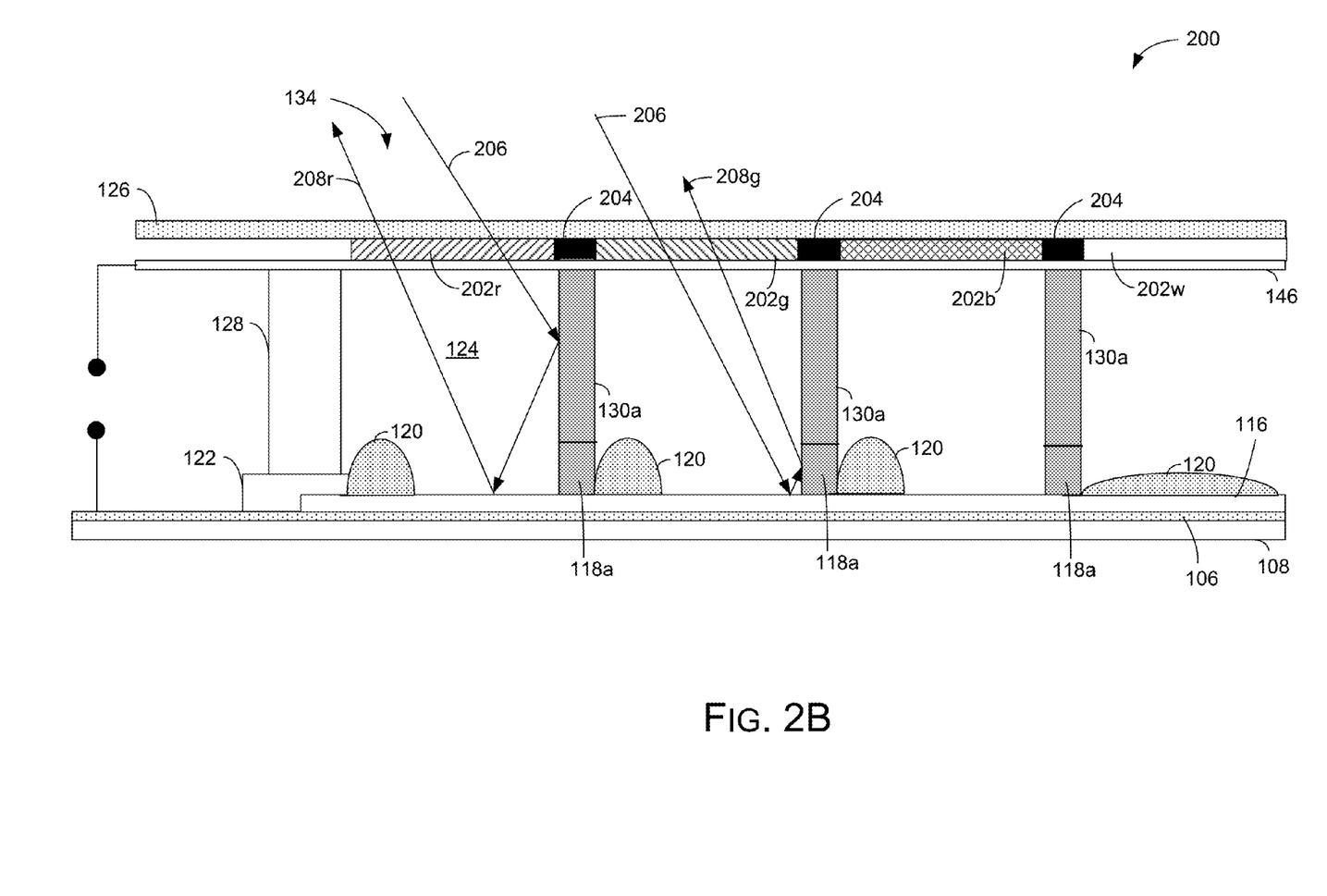
FIG. 2B schematically illustrates light paths of incident and reflected light within pixels or subpixels of an electrowetting display, according to some embodiments.

Thus, as can be seen in FIG. 2B, incident light 206 enters pixels or subpixels and reflects off the hydrophobic layer 116. Reflected light 208 that encounters reflective spacers 130*a* and/or reflective partition walls 118*a* are reflected such that the reflected light 208 exits from the same pixel or subpixel into which the incident light 206 entered. Luminance may generally be improved and color shifts may be minimized.

In embodiments, the partition walls 118*a* provide diffuse reflection and the spacers 130*a* may provide specular reflection. Since the partition walls 118*a* are close to the hydrophobic layer 116 on the first support plate 108, the hydrophobic layer 116 will collect the diffuse reflected light and reflect the collected light out of the pixel or subpixel to thereby provide improved brightness for the electrowetting display panel 100. In other embodiments, the partition walls 118*a* provide specular reflection and the spacers 130*a* may provide diffuse reflection. In some embodiments, the partition walls 118*a* and the spacers 130*a* may provide the same type of reflection. In embodiments, the edge seals 128 may also be reflective in a manner described herein with respect to the spacers 130*a* and partition walls 118*a*.

The materials provided to the photoresist material for the spacers 130*a* and/or partition walls 118*a* may be provided to the photoresist material by doping, adding, dispersing, dissolving or embossing, etc. the desired materials to the photoresist material. A coating or film of reflective material, e.g., materials previously mentioned, may be applied to the spacers 130 and/or the partition walls 118 and then an etching process may be applied to remove portions of the film or coating.

In embodiments, the spacers 130a are approximately 16-18 microns in height while the partition walls 118a are approximately 2-4 microns in height. Other dimensions may be used depending on the distance between the first support plate 108 and the second support plate 126. Additionally, in embodiments, the partition walls 118a may extend substantially entirely between the first support plate 108 and the second support plate 126 (or layers thereon), and thus, no spacers 130a would be included.

While embodiments have been described with respect to a reflective electrowetting display, it should be noted that the embodiments are equally applicable to transmissive and transflective electrowetting displays. Transmissive electrowetting displays, as well as transflective electrowetting displays operating in a transmissive mode, that include reflective spacers 130a and/or reflective partition walls 118a will have more light exiting pixels or subpixels into which the incident light entered. Additionally, while embodiments have been described as including a color filter layer including color filter elements 202, embodiments need not include a color filter layer, e.g., one or more of the first fluid 120 and the second fluid 124 may be colored, the electrowetting display 102 may be configured as a black and white display, etc.

Figure 3:
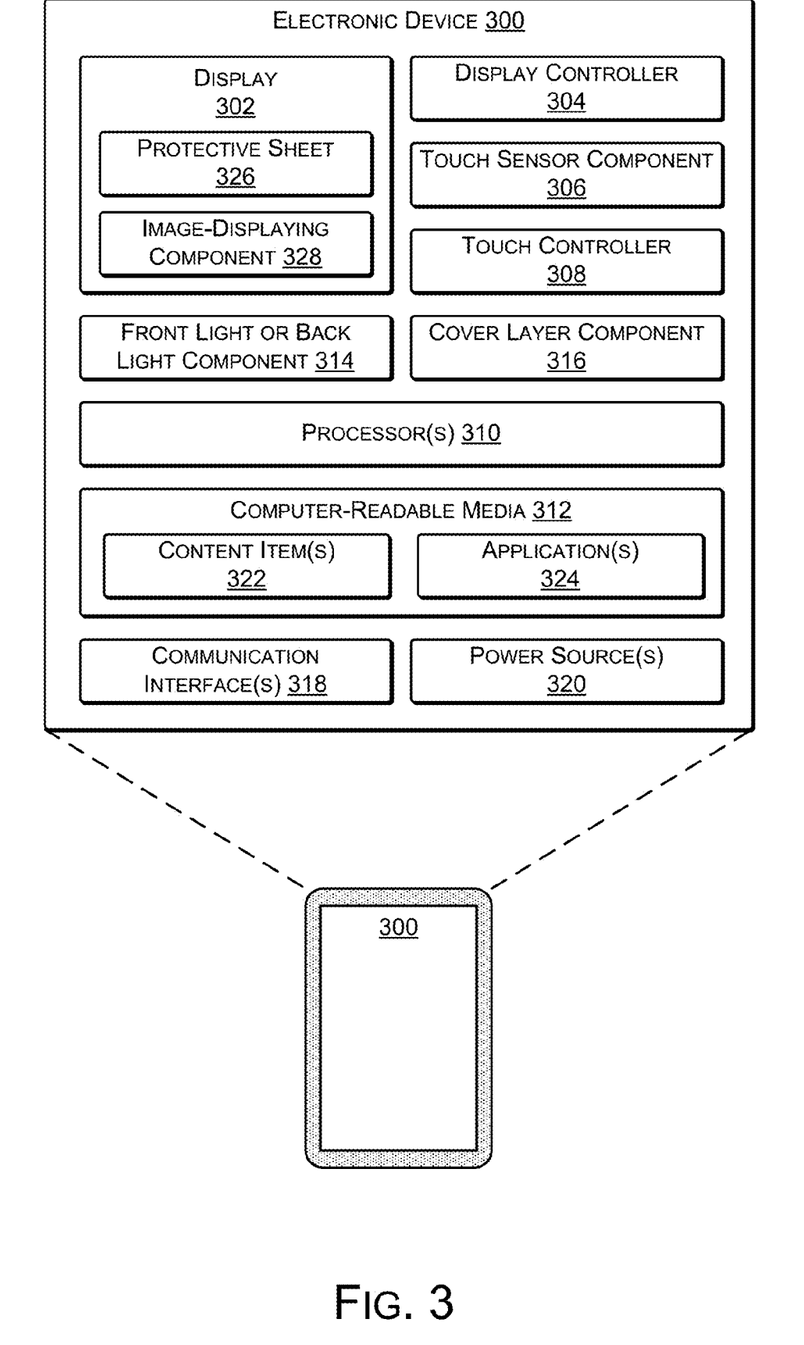
FIG. 3 illustrates an example electronic device that may incorporate a display device, according to some embodiments.

FIG. 3 illustrates an example electronic device 300 that may incorporate any of the displays discussed above. The device 300 may comprise any type of electronic device having a display. For instance, the device 300 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 300 may be a non-mobile electronic device (e.g., a computer display, a television, etc.). In addition, while FIG. 3 illustrates several example components of the electronic device 300, it is to be appreciated that the device 300 may also include other conventional components, such as an operating system, system busses, input/output components, and the like. Further, in other examples, such as in the case of a television or computer monitor, the electronic device 300 may only include a subset of the components illustrated.

Regardless of the specific implementation of the electronic device 300, the device 300 includes a display 302 and a corresponding display controller 304. The display 302 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 302 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 300, the display 302 may be an active display such as a liquid crystal display, a plasma display, a light emitting diode display, an organic light emitting diode display, an electrowetting display and so forth. Accordingly, implementations herein are not limited to any particular display technology.

In an implementation, the display comprises an electrowetting display that employs an applied voltage to change the surface tension of a fluid in relation to a surface. For example, such an electrowetting display may be the same as or similar to the electrowetting displays illustrated in FIGS. 1A-1B and 2B, though claimed subject matter is not limited in this respect. By applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels or subpixels of the display. When the voltage is absent, the colored oil forms a continuous film within a pixel or subpixel, and the color may thus be visible to a user of the display. On the other hand, when the voltage is applied to the pixel or subpixel, the colored oil is displaced and the pixel or subpixel becomes transparent. When multiple pixels or subpixels of the display are independently activated, the display can present a color or grayscale image. The pixels or subpixels may form the basis for a transmissive, reflective, or transmissive/reflective (transflective) display. Further, the pixels or subpixels may be responsive to high switching speeds (e.g., on the order of several milliseconds), while employing small pixel or subpixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels or subpixels. As such, the terms "white," "gray," and "black" may refer to varying degrees of color in implementations utilizing color displays. For instance, where a pixel or subpixel includes a red color filter, a "gray" value of the pixel or subpixel may correspond to a shade of pink while a "black" value of the pixel or subpixel may correspond to a darkest red of the color filter. Furthermore, while some examples herein are described in the environment of a reflective display, in other examples, the display 302 may represent a backlit display, examples of which are mentioned above.

In addition to including the display 302, FIG. 3 illustrates that some examples of the device 300 may include a touch sensor component 306 and a touch controller 308. In some instances, at least one touch sensor component 306 resides with, or is stacked on, the display 302 to form a touch-sensitive display (e.g., an electronic paper touch-sensitive display). Thus, the display 302 may be capable of both accepting user touch input and rendering content in response to or corresponding to the touch input. As several examples, the touch sensor component 306 may comprise a capacitive touch sensor, a force sensitive resistance (FSR), an interpolating force sensitive resistance (IFSR) sensor, or any other type of touch sensor. In some instances, the touch sensor component 306 is capable of detecting touches as well as determining an amount of pressure or force of these touches.

FIG. 3 further illustrates that the electronic device 300 may include one or more processors 310 and one or more computer-readable media 312, as well as a front light component 314 (which may alternatively be a backlight component in the case of a backlit display) for lighting the display 302, a cover layer component 316, such as a cover glass or cover sheet, one or more communication interfaces 318 and one or more power sources 320. The communication interfaces 318 may support both wired and wireless connection to various networks, such as cellular networks, radio, WiFi networks, short range networks (e.g., Bluetooth®), infrared (IR), and so forth.

Depending on the configuration of the electronic device 300, the computer-readable media 312 (and other computer-readable media described throughout) is an example of computer storage media and may include volatile and non-volatile memory. Thus, the computer-readable media 312 may include, but is not limited to, RAM, ROM, EEPROM, flash memory, or other memory technology, or any other medium that can be used to store computer-readable instructions, programs, applications, media items, and/or data which can be accessed by the electronic device 300.

The computer-readable media 312 may be used to store any number of functional components that are executable on the processor 310, as well as content items 322 and applications 324. Thus, the computer-readable media 312 may include an operating system and a storage database to store one or more content items 322, such as eBooks, audio books, songs, videos, still images, and the like. The computer-readable media 312 of the electronic device 300 may also store one or more content presentation applications to render content items on the device 300. These content presentation applications may be implemented as various applications 324 depending upon the content items 322. For instance, the content presentation application may be an electronic book reader application for rendering textual electronic books, an audio player for playing audio books or songs, a video player for playing video, and so forth.

In some instances, the electronic device 300 may couple to a cover (not illustrated in FIG. 3) to protect the display (and other components in the display stack or display assembly) of the device 300. In one example, the cover may include a back flap that covers a back portion of the device 300 and a front flap that covers the display 302 and the other components in the stack. The device 300 and/or the cover may include a sensor (e.g., a Hall Effect sensor) to detect when the cover is open (i.e., when the front flap is not atop the display and other components). The sensor may send a signal to the front light component 314 when the cover is open and, in response, the front light component 314 may illuminate the display 302. When the cover is closed, meanwhile, the front light component 314 may receive a signal indicating that the cover has closed and, in response, the front light component 314 may turn off.

Furthermore, the amount of light emitted by the front light component 314 may vary. For instance, upon a user opening the cover, the light from the front light may gradually increase to its full illumination. In some instances, the device 300 includes an ambient light sensor (not illustrated in FIG. 3) and the amount of illumination of the front light component 314 may be based at least in part on the amount of ambient light detected by the ambient light sensor. For example, the front light component 314 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 302 may vary depending on whether the front light component 314 is on or off, or based on the amount of light provided by the front light component 314. For instance, the electronic device 300 may implement a larger default font or a greater contrast when the light is off compared to when the light is on. In some instances, the electronic device 300 maintains, when the light is on, a contrast ratio for the display that is within a certain defined percentage of the contrast ratio when the light is off.

As described above, the touch sensor component 306 may comprise a capacitive touch sensor that resides atop the display 302. In some examples, the touch sensor component 306 may be formed on or integrated with the cover layer component 316. In other examples, the touch sensor component 306 may be a separate component in the stack of the display assembly. The front light component 314 may reside atop or below the touch sensor component 306. In some instances, either the touch sensor component 306 or the front light component 314 is coupled to a top surface of a protective sheet 326 of the display 302. As one example, the front light component 314 may include a lightguide sheet and a light source (not illustrated in FIG. 3). The lightguide sheet may comprise a substrate (e.g., a transparent thermoplastic such as PMMA or other acrylic), a layer of lacquer and multiple grating elements formed in the layer of lacquer that function to propagate light from the light source towards the display 302, thus illuminating the display 302.

The cover layer component 316 may include a transparent substrate or sheet having an outer layer that functions to reduce at least one of glare or reflection of ambient light incident on the electronic device 300. In some instances, the cover layer component 316 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 326 may include a similar UV-cured hard coating on the outer surface. The cover layer component 316 may couple to another component or to the protective sheet 326 of the display 302. The cover layer component 316 may, in some instances, also include a UV filter, a UV-absorbing dye, or the like, for protecting components lower in the stack from UV light incident on the electronic device 300. In still other examples, the cover layer component 316 may include a sheet of high-strength glass having an antiglare and/or antireflective coating.

The display 302 includes the protective sheet 326 overlying an image-displaying component 328. For example, the display 302 may be preassembled to have the protective sheet 326 as an outer surface on the upper or image-viewing side of the display 302. Accordingly, the protective sheet 326 may be integral with and may overlie the image-displaying component 328. The protective sheet 326 may be optically transparent to enable a user to view, through the protective sheet 326, an image presented on the image-displaying component 328 of the display 302.

In some examples, the protective sheet 326 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 326 may include a coating, such as the hard coating described above. For instance, the hard coating may be applied to the outer surface of the protective sheet 326 before or after assembly of the protective sheet 326 with the image-displaying component 328 of the display 302. In some examples, the hard coating may include a photoinitiator or other reactive species in its composition, such as for curing the hard coating on the protective sheet 326. Furthermore, in some examples, the protective sheet 326 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 326, thereby protecting the image-displaying component 328 from UV light.

According to some implementations herein, one or more of the components discussed above may be coupled to the display 302 using fluid optically-clear adhesive (LOCA). For example, suppose that the light guide portion of the front light component 314 is to be coupled to the display 302. The light guide may be coupled to the display 302 by placing the LOCA on the outer or upper surface of the protective sheet 326. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 314 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 314. In other implementations, the LOCA may be placed near a center of the protective sheet 326, and pressed outwards towards a perimeter of the top surface of the protective sheet 326 by placing the front light component 314 on top of the LOCA. The LOCA may then be cured by directing UV light through the front light component 314. As discussed above, and as discussed additionally below, various techniques, such as surface treatment of the protective sheet, may be used to prevent discoloration of the LOCA and/or the protective sheet 326.

While FIG. 3 illustrates a few example components, the electronic device 300 may have additional features or functionality. For example, the device 300 may also include additional data storage devices (removable and/or non-removable) such as, for example, magnetic disks, optical disks, or tape. The additional data storage media, which may reside in a control board (not illustrated), may include volatile and nonvolatile, removable and non-removable media implemented in any method or technology for storage of information, such as computer readable instructions, data structures, program modules, or other data. In addition, some or all of the functionality described as residing within the device 300 may reside remotely from the device 300 in some implementations. In these implementations, the device 300 may utilize the communication interfaces 318 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

The invention claimed is:

1. An electrowetting display comprising:
    a first support plate and a second support plate;
    a plurality of partition walls on the first support plate;
    a plurality of electrowetting elements between the first and second support plates, wherein the plurality of partition walls separates the electrowetting elements, and wherein each electrowetting element of the plurality of electrowetting elements includes:
        portions of one or more of the partition walls;
        a hydrophobic layer; and
        an oil disposed on the hydrophobic layer and a transparent conductive fluid that is substantially immiscible with the oil; and
    a plurality of spacers on the second substrate and aligned with the partition walls; and
    a first and a second electrode, wherein a voltage between the first and second electrodes causes a portion of the oil to be displaced on the hydrophobic layer by the transparent conductive fluid to expose a portion of the hydrophobic layer, wherein the plurality of spacers comprise a reflective material such that the spacers reflect substantially all parts of the optical spectrum of light that is incident to and reflected from the exposed portion of the hydrophobic layer.

2. The electrowetting display of claim 1, wherein the reflective material comprises a metal that provides specular reflection.

3. The electrowetting display of claim 1, wherein the reflective material comprises a dye or pigment that provides diffuse reflection.

4. The electrowetting display of claim 1, wherein the reflective material has a refractive index that is one of (i) greater than a refractive index of the transparent conductive fluid by 0.15 or more or (ii) less than a refractive index of the conductive fluid by 0.15 or more.

5. An electrowetting display comprising:
a plurality of electrowetting elements separated by partition walls; and
a plurality of spacers over and substantially aligned with the partition walls, wherein each spacer of the plurality of spacers comprises a first reflective material such that the spacers reflect substantially all parts of the optical spectrum of light.

6. The electrowetting display of claim 5, wherein the first reflective material provides specular reflection.

7. The electrowetting display of claim 6, wherein the first reflective material comprises aluminum.

8. The electrowetting display of claim 5, wherein the first reflective material provides diffuse reflection.

9. The electrowetting display of claim 8, wherein the first reflective material comprises a dye or pigment.

10. The electrowetting display of claim 9, wherein the reflective material comprises titanium oxide.

11. The electrowetting display of claim 5, wherein the first reflective material comprises a granular material that provides diffuse reflection.

12. The electrowetting display of claim 11, wherein the first reflective material comprises one or more of an aluminum agglomerate or a silver agglomerate.

13. The electrowetting display of claim 5, wherein the electrowetting elements comprise a conductive fluid, and wherein the first reflective material has a refractive index that is one of (i) greater than a refractive index of the transparent conductive fluid by 0.15 or more or (ii) less than a refractive index of the conductive fluid by 0.15 or more.

14. The electrowetting display of claim 5, wherein the partition walls comprise a second reflective material.

15. The electrowetting display of claim 14, wherein the second reflective material comprises a metal that provides specular reflection.

16. The electrowetting display of claim 14, wherein the second reflective material comprises a dye or pigment that provides diffuse reflection.

17. The electrowetting display of claim 14, wherein the second reflective material comprises one or more of an aluminum agglomerate or a silver agglomerate that provides diffuse reflection.

18. The electrowetting display of claim 14, wherein the electrowetting elements comprise a conductive fluid, and wherein the second reflective material has a refractive index that is one of (i) greater than a refractive index of the transparent conductive fluid by 0.15 or more or (ii) less than a refractive index of the conductive fluid by 0.15 or more.

19. The electrowetting display of claim 14, wherein the first reflective material and the second reflective material comprise different materials.

20. The electrowetting display of claim 14, wherein the first reflective material and the second reflective material comprise the same material.

* * * * *